H. F. PARISH.
METHOD OF ELECTRIC WELDING.
APPLICATION FILED AUG. 11, 1911.
1,034,290.
Patented July 30, 1912.
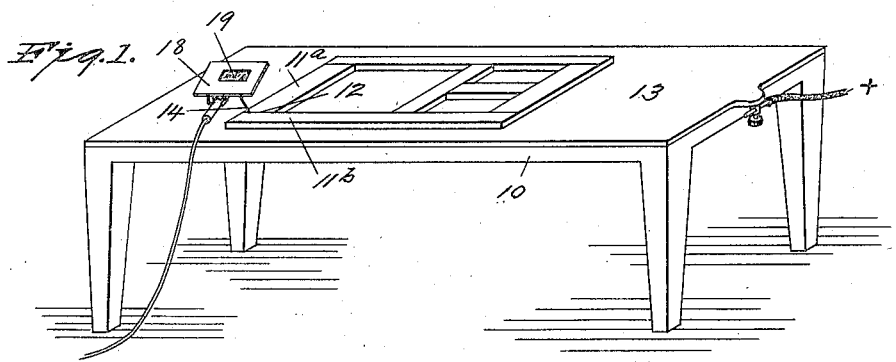
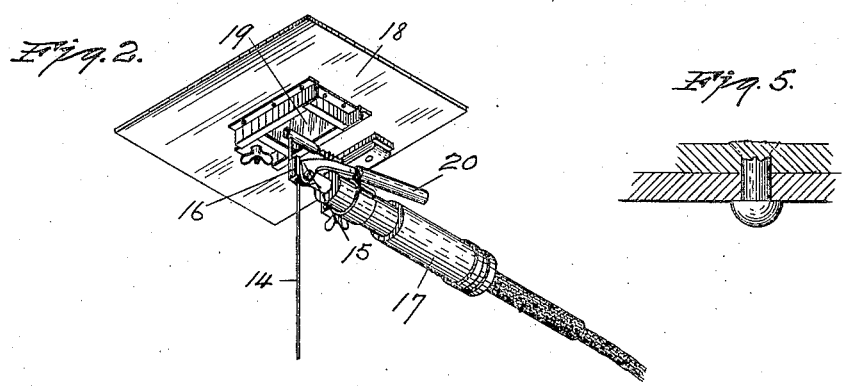
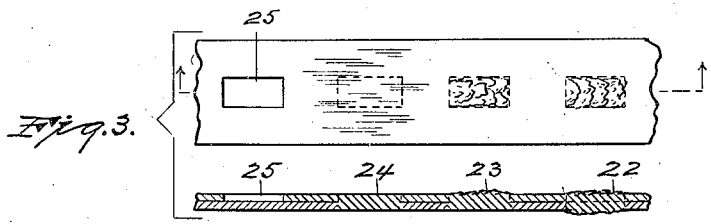
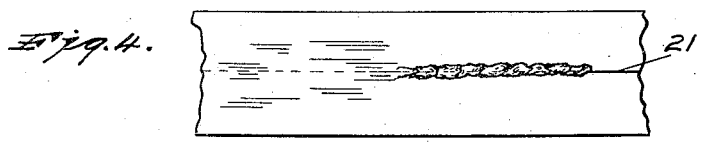
Witnesses:
Inventor
HAROLD F. PARISH
By his Attorneys

UNITED STATES PATENT OFFICE.

HAROLD F. PARISH, OF NEW YORK, N. Y., ASSIGNOR TO GRINDEN ART METAL COMPANY, A CORPORATION OF NEW YORK.

METHOD OF ELECTRIC WELDING.

1,034,290. Specification of Letters Patent. Patented July 30, 1912.

Application filed August 11, 1911. Serial No. 643,556.

*To all whom it may concern:*

Be it known that I, HAROLD F. PARISH, a citizen of the United States of America, and a resident of the borough of Brooklyn, in the county of Kings, city and State of New York, have invented a certain new and Improved Method of Electric Welding, of which the following is a specification.

My invention relates to a novel method and apparatus for electric welding, the object of my invention being to provide a simple and efficient method of operation and convenient apparatus therefor adapted for shop use.

The present process relates to that class of electric welding in which an arc is struck between the articles to be welded and an electrode. In this class of welding it has heretofore been customary to obtain the necessary weld by the action of the arc upon the juxtaposed surfaces of the joint, the latter being fused by the arc and mingling to form a homogeneous joint. This action is extremely deleterious to the temper and fiber of the metal adjacent the joint and the process has consequently not gone into extensive use. It has been proposed also to use a fusible electrode which, under the heat of the arc, is fused so that its substance mingles with the fused metal of the articles at the joint and reinforces the latter. The fusible electrodes used in this process have been of relatively large diameter, however, and the play of the arc over the end of such an electrode is such that it does not constantly and intensely heat a single spot. Furthermore it has been the common practice to connect the movable electrode to the positive source of electricity and this, together with the size of the electrode, has been found to cause the latter to fuse unevenly and slowly, while the metal of the joint is heated to fusion by the arc, with consequent deleterious effect upon the adjacent portions of the metal. Moreover it is found also that the electrode shows a tendency to adhere to the weld, hampering the workman. Again, current regulating devices of more or less complicated nature have proven necessary to insure a fairly even flow of current to the joint from the positive electrode.

I avoid these difficulties and form the joint substantially in its entirety by the material of the electrode, by connecting the latter to the negative pole of the source of electricity. I avoid the overheating and fusing of the metal near the joints, and the bond between this metal and the material of the electrode is accomplished through the high temperature of the fused metal of the electrode alone. I employ an electrode of relatively small diameter, preferably of material of substantially the same character as that of the articles to be welded, and pass the welding current from the joint to the electrode, so that the latter receives the major part of the heat of the arc, and that the electrode forms the negative pole. The electrode rapidly fuses, falling practically as a stream upon the joint. This stream of molten metal from the electrode, passing through the arc, is at a very high temperature so that its radiant heat completes the fusion of the metal immediately at the joint and forms a bond between the juxtaposed surfaces which is practically as homogeneous as if these surfaces had been fused together solely by the action of the arc upon the material thereof, while at the same time it is much less injurious to the surrounding metal.

When the joint is to be made along a seam, the operator, after striking the arc, follows steadily along the line of the seam. A joint a foot long is ordinarily completed in a minute or two—or if the seam is slightly open, a second passage of the electrode over it, fills the joint with the fused electrode material and the joint is completed. If merely a local union between juxtaposed flat plates is desired, it is readily obtained by recessing one or both of the plates and following the outline of the recess with the electrode, the material from which rapidly fills the recess so formed and bonds the plates together. A rivet passed through two plates may be permanently bonded in position by following its periphery with the electrode.

In the accompanying drawing, I have shown a simple apparatus by which the process may be put into operation.

Figure 1 is a perspective of an operating table; Fig. 2 is an enlarged perspective of the electrode tool; Fig. 3 is a plan and section through superposed plates welded according to the process; Fig. 4 is a plan of juxtaposed plates welded at their meeting edges; Fig. 5 is a vertical section showing a bolt welded to the metal surface.

The table 10, upon which the articles 11ª and 11ᵇ are laid preparatory to forming the joint at 12, may have a metal top 13 which forms a conductor from the positive source of electricity to the metal at the joint 12. The electrode 14 of relatively light metal wire, is gripped at its upper end between the spring jaw 15 and frame 16 which is grasped by the operator at the handle 17 of insulating fiber. The wires leading to the negative pole pass through the handle. Substantially horizontal above the wire 14 is arranged a protective screen 18 of fiber or other insulating material, with sight aperture 19 filled with colored glass through which the operator observes the arc.

The manner of using the apparatus is readily understood. After adjusting a wire in the clamp, which is opened by pressing the thumb upon the lever 20 of the spring jaw, the operator strikes the arc at the joint and moves gradually along the same, constantly observing the length of the arc and the fall of the material of the electrode upon the joint. As soon as the electrode is consumed, which, when the arc is continuous, takes about two minutes for a twelve inch iron electrode of three-thirty-secondths inch diameter, a fresh wire is placed in the holder and the operation repeated.

In Fig. 4, I have shown a seam 21 welded in the manner described, and in Fig. 3 two plates are joined by welding through a recess. At 22 in this figure, both plates have been perforated and the material of the joint is shown extended on both sides. At 23 the upper plate only has been recessed. At 24 the material of the joint is ground away to show the homogeneity of the joint. And at 25 the form of a suitable recess is shown, though any desired form may be given thereto.

In Fig. 5 a bolt is shown with its shank end welded to the adjacent metal.

Various modifications of the apparatus and ways of carrying out the invention will suggest themselves, but I do not limit my invention to the precise forms shown and described.

I claim as my invention,

1. An improved method of electric welding which consists in passing an electric currrent in the form of an arc from juxtaposed articles at their welding joint to a light wire metal electrode forming the negative electrode and moving the electrode along the welding joint, whereby the rapidly fused metal of the electrode falls upon the softened metal at the joint and fusing therewith forms a substantially homogeneous joint, substantially as described.

2. An improved method of electric welding which consists in striking an arc between the welding joint of juxtaposed metals and a light metal wire of substantially the same nature forming the negative electrode, and moving said electrode during its rapid fusion under the action of the arc, along the line of the joint, whereby the highly heated metal of said electrode is deposited upon the heated metal at the joint, completes the fusion thereof and forms therewith a substantially homogeneous joint, substantially as described.

3. An improved method of electric welding which consists in passing an electric current in the form of an arc from juxtaposed metallic articles at their welding joint to a metal electrode forming the negative electrode and moving the electrode along the welding joint, whereby the rapidly fused metal of the electrode falls upon the metal at the joint and fusing therewith forms a substantially homogeneous joint.

4. An improved method of welding iron joints which consists in passing an electric current in the form of an arc from the metal at the welding joint to an iron electrode forming a negative electrode and moving the electrode along the joint, whereby the rapidly fused metal of the electrode falls upon the joint and fusing therewith forms a substantially homogeneous joint, substantially as described.

5. An improved method of electric welding which consists in passsing an electric current in the form of an arc from juxtaposed iron articles at their welding joint to an iron electrode, the latter forming the negative electrode and being of small size relative to the articles to be welded and moving the electrode along the welding joint, whereby the rapidly fused metal of the electrode falls upon the metal at the joint and fusing therewith forms a substantially homogeneous joint, substantially as described.

In testimony whereof I have signed my name to this specification, in the presence of two subscribing witnesses.

HAROLD F. PARISH.

Witnesses:
W. B. BENNETT,
THOMAS F. BERRILL.